(12) United States Patent
Garces et al.

(10) Patent No.: US 7,239,035 B2
(45) Date of Patent: Jul. 3, 2007

(54) SYSTEM AND METHOD FOR INTEGRATING WIND AND HYDROELECTRIC GENERATION AND PUMPED HYDRO ENERGY STORAGE SYSTEMS

(75) Inventors: Luis Jose Garces, Niskayuna, NY (US); Yan Liu, Ballston lake, NY (US); Sumit Bose, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 49 days.

(21) Appl. No.: 11/282,378

(22) Filed: Nov. 18, 2005

(65) Prior Publication Data

US 2007/0114796 A1    May 24, 2007

(51) Int. Cl.
  *F03B 17/00* (2006.01)
(52) U.S. Cl. ............... 290/43; 290/54; 60/398
(58) Field of Classification Search ........ 290/43, 290/44, 54, 55; 60/398, 698
See application file for complete search history.

(56) References Cited

U.S. PATENT DOCUMENTS

| | | | | |
|---|---|---|---|---|
| 4,031,702 A * | 6/1977 | Burnett et al. ........... | 60/398 |
| 4,055,950 A * | 11/1977 | Grossman ............... | 60/398 |
| 4,058,979 A * | 11/1977 | Germain ................ | 60/327 |
| 4,166,222 A * | 8/1979 | Hanley ................. | 290/55 |
| 4,206,608 A * | 6/1980 | Bell .................... | 60/698 |
| 4,321,475 A * | 3/1982 | Grub ................... | 290/52 |
| 4,380,419 A * | 4/1983 | Morton ................. | 417/334 |
| 4,426,846 A * | 1/1984 | Bailey .................. | 60/398 |
| 6,023,105 A * | 2/2000 | Youssef ................ | 290/54 |
| 6,051,892 A * | 4/2000 | Toal, Sr. ............... | 290/43 |
| 6,099,255 A * | 8/2000 | Lee .................... | 416/169 R |
| 6,100,600 A * | 8/2000 | Pflanz .................. | 290/54 |
| 6,718,761 B2 | 4/2004 | Merswolke et al. ...... | 60/398 |
| 6,745,109 B2 | 6/2004 | Kojina et al. ........... | 700/291 |
| 6,860,068 B2 | 3/2005 | Halloran ............... | 52/1 |
| 6,861,766 B2 * | 3/2005 | Rembert ................ | 290/43 |
| 2003/0090233 A1 | 5/2003 | Browe .................. | 320/101 |
| 2005/0034452 A1 | 2/2005 | Davis ................... | 60/398 |
| 2005/0161950 A1 | 7/2005 | Borden et al. .......... | 290/44 |

OTHER PUBLICATIONS

M. N. Marwali et al.; "Control of Distributed Generation Systems—Part II: Load Sharing Control;" IEEE Transactions on Power Electronics, vol. 19, No. 6, Nov. 2004; pp. 1551-1561.
Pumped-storage hydroelectricity, [online]; [retrieved on Nov. 4, 2005]; retrieved from the Internet http://www.en.wilipedia.org/wiki/pumped-storage_hydroelectricity.

* cited by examiner

*Primary Examiner*—Nicholas Ponomarenko
(74) *Attorney, Agent, or Firm*—Ann M. Agosti; Patrick A. Patnode

(57) ABSTRACT

An integrated, wind-pumped hydro power generation system includes at least one wind turbine generator device configured to generate output power for a common bus, and at least one hydro generator device configured to generate output power for the common bus. The hydro generator device is powered by water flow. The wind turbine generator device and the hydro generator device include corresponding local controls associated therewith, and a set of supervisory controls is in communication with the common bus and each of the local controls.

25 Claims, 5 Drawing Sheets

SYSTEM AND METHOD FOR INTEGRATING WIND AND HYDROELECTRIC GENERATION AND PUMPED HYDRO ENERGY STORAGE SYSTEMS

BACKGROUND OF THE INVENTION

The present disclosure relates generally to renewable power generation systems and, more particularly, to a system and method for integrating wind pumped and hydroelectric energy storage systems.

Wind is one of the fastest growing renewable energy resources. Turbines, which use the kinetic energy of wind to generate mechanical energy, convert the mechanical energy to electricity. Wind turbines typically have two or three blades that are faced into or away from the wind. As the wind causes the blades to rotate, the shaft in the turbine spins. The mechanical energy generated may be used to power certain tasks, such as pumping water for example, or the mechanical energy may be converted to electricity. When connected to a generator, the spinning of the shaft drives a generator, which in turn produces electricity.

However, the intermittent nature and variable speed of wind are the major drawbacks of wind generation systems, thus resulting in low system availability and low penetration. Existing solutions to the intermittency problem of wind power generation devices (such as through the use of energy storage systems) have traditionally either been cost prohibitive or have low energy efficiency. Another way to mitigate intermittency and increase system availability is to use wind generation in parallel with other generating sources, which can be complimentary to the wind. It has been observed that in certain locations of the world, wind and hydro show complimentary patterns of availability, both on a daily basis and a seasonal basis.

Pumped hydroelectric storage is one of the more economically viable energy storage methods. At times of low electrical demand, excess electrical capacity is used to pump water into an upper reservoir. When there is higher demand, water is released back into the lower reservoir through a turbine, thereby generating hydroelectricity. Reversible turbine/generator assemblies can act as both pump and turbine. Some facilities, for example, use abandoned mines as the lower reservoir, while others use the height difference between two natural bodies of water or artificial reservoirs. As a result of evaporation losses from the exposed water surface and mechanical efficiency losses during conversion, about 60% to about 85% of the electrical energy used to pump the water into the elevated reservoir may be regained from this process. This compares relatively favorably with respect to other energy storage devices such as some types of batteries and hydrogen fuel cells.

Notwithstanding the respective advantages of wind generated power systems and hydroelectric storage systems, the challenges of integrating wind with pumped hydroelectric storage (as well as with loads in both grid-connected and stand-alone systems) while, at the same time, optimizing energy usage and maintaining transient stability have not been adequately addressed. In addition, problems such as frequency and voltage references, pump and generation mode transition, interaction with power electronic interfaced loads, and stand-alone operation still need to be solved.

Moreover, there are no directly integrated, wind-pumped hydro systems presently in operation. Most of the documented or proposed systems are intended to function at high power levels and are operated only as grid-connected systems. Accordingly, it would be desirable to implement an integrated, wind-pumped hydroelectric system that provides a cost effective solution to the intermittency issue, for both grid-connected and stand-alone applications.

BRIEF DESCRIPTION OF THE INVENTION

Disclosed herein is an integrated, wind-pumped hydro power generation system. In an exemplary embodiment, the system includes at least one wind turbine generator device configured to generate output power for a common bus, and at least one hydro generator device configured to generate output power for the common bus. The hydro generator device is powered by water flow. The wind turbine generator device and the hydro generator device include corresponding local controls associated therewith, and a set of supervisory controls is in communication with the common bus and each of the local controls.

In another embodiment, a stand-alone, integrated power system includes at least one wind turbine generator device configured to generate output power for a common bus, and at least one hydro generator device configured to generate output power for the common bus. The hydro generator device is powered by water flow. The wind turbine generator device and hydro generator device include corresponding local controls associated therewith. A set of supervisory controls is in communication with the common bus and each of said local controls, wherein the supervisory controls are configured for dynamically controlling master frequency and voltage references of the system.

In still another embodiment, a method for dynamically controlling an integrated, wind-pumped hydro power generation system includes configuring a set of supervisory controls in communication with corresponding local controls associated with at least one wind turbine generator device configured to generate output power for a common bus, and associated with at least one hydro generator device configured to generate output power the common bus. The hydro generator device is powered by water flow. The supervisory controls are configured to dynamically control master frequency and voltage references of the system.

BRIEF DESCRIPTION OF THE DRAWINGS

Referring to the exemplary drawings wherein like elements are numbered alike in the several Figures.

DETAILED DESCRIPTION OF THE INVENTION

Disclosed herein is an integrated system for grid and/or stand-alone applications that takes advantage of two of the most economically viable renewable sources (wind and water), and solves the intermittency issues that limit the use of wind power. Moreover, the embodiments herein also provide a solution for the direct integration of wind with pumped hydro storage, as well as with conventional hydro (i.e., run-of-river). As will be shown, the integrated, wind pumped hydro system may be operated as a grid-connected system and/or a stand-alone system. In certain embodiments, power components may be integrated through a common alternating current (AC) bus or direct current (DC) bus wherein, for the latter case, through the DC bus of the power converter wherever available. Furthermore, the invention embodiments disclosed herein provide novel voltage and frequency regulation through local and/or supervisory control to accommodate a stand-alone operation.

Figure 1:
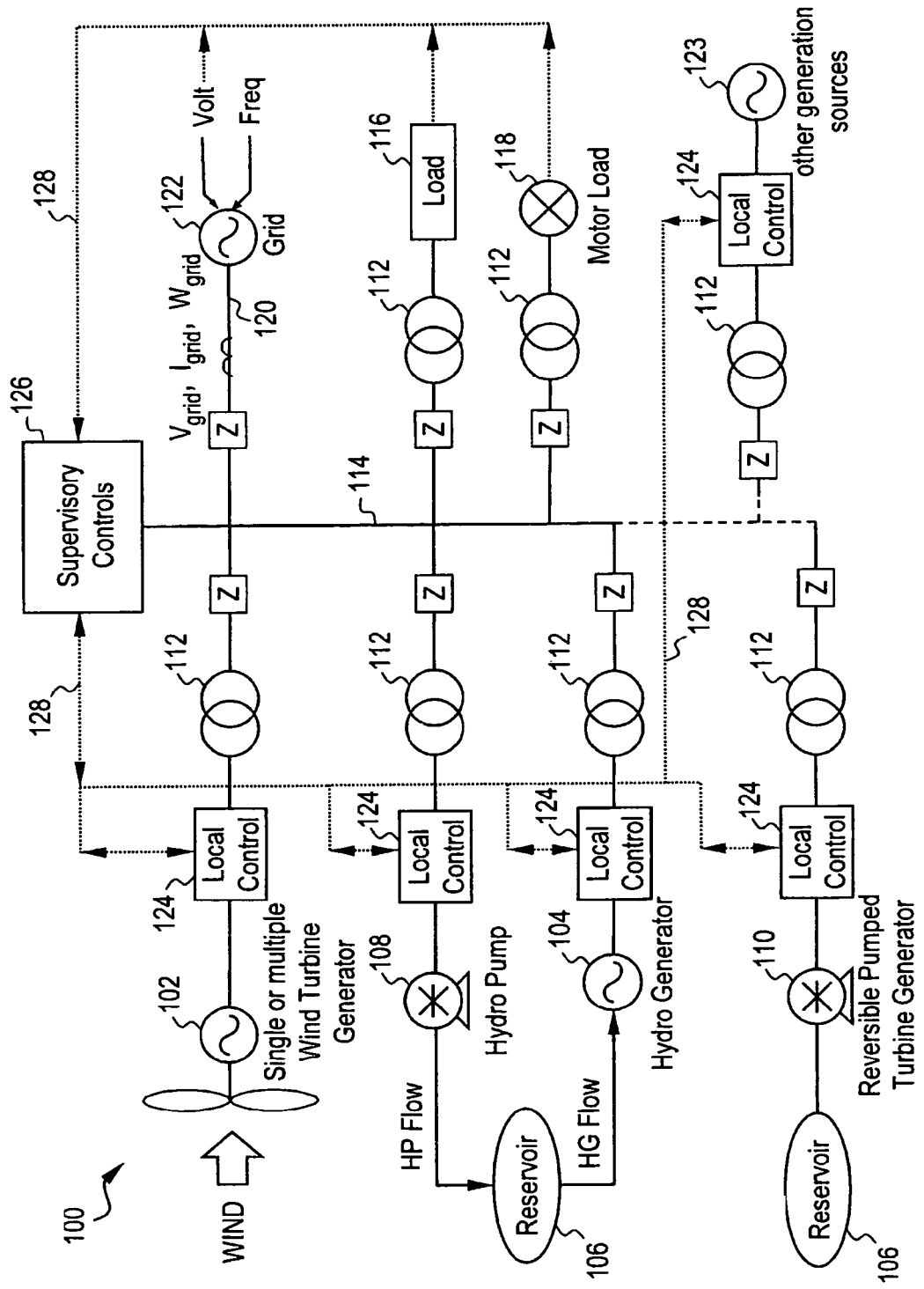
FIG. 1 is a schematic block diagram of an integrated, wind pumped hydro system that is configured as a grid-connected system, in accordance with an embodiment of the invention.

Referring initially to FIG. 1, there is shown a schematic block diagram of an integrated, wind pumped hydro system 100 that is configured as a grid-connected system, in accordance with an embodiment of the invention. The system 100 is characterized by a wind turbine generator 102 (which can be embodied by single or multiple wind turbine generators) operating in parallel with a hydro generator 104 powered by water flow from a water source (e.g., a storage reservoir 106). In one embodiment, the storage reservoir 106 is a rechargeable reservoir in that the supply of water in the reservoir is replenished by charging with water through a separate hydro pump(s) 108. The hydro pump(s) 108 may be either constant speed or variable speed. As an alternative embodiment, FIG. 1 also depicts a reversible, pumped turbine generator 110 that may serve as both the hydro generator for providing electrical power and as the hydro pump for charging the reservoir 106.

The power generated by the wind and hydro generators is coupled (through transformers 112) to a common power bus 114, which is an AC bus in the embodiment illustrated. As will be illustrated hereinafter, however, a DC bus (e.g., such as the DC link of the wind turbine converters) may also be used as the common bus, which can provide a savings in terms of reducing hardware redundancy. Also shown coupled to the common power bus 114 are various local loads 116, 118, which may represent simple impedance loads, motor loads, or loads with power electronic interfaces, as well as other energy storage devices such as batteries. As the embodiment of FIG. 1 represents a grid-connected system, a connection of the common power bus 114 to a grid 120 is also illustrated, including each of the grid generation sources associated therewith (generally depicted at 122).

In addition to the local parallel combination of wind and hydro generators, the system 100 may also optionally be configured with additional power generation or storage sources 123, such as gasoline/diesel engine powered generators, turbines, photovoltaic cells, fuel cells or storage batteries, for example.

As is further illustrated in FIG. 1, the integrated, wind pumped hydro system 100 is managed through both local controls 124 and centralized supervisory controls 126 in order to overcome the intermittency issues associated with wind generated power. The supervisory controls 126 communicate with the individual local controls 124 through a communications bus 128. For a stand-alone configuration, the system voltage and frequency references are dynamically determined by one of the power components (e.g., wind or hydro) such that the load sharing capability is provided by local controls 124 or by (e.g., droop control) or by the supervisory control 126. The supervisory controls 126 are also configured to provide energy management and regulatory controls. To this end, the supervisory controls can be configured to receive various types of input data (e.g., wind, hydrological forecast information) through an applicable network such as, for example, a local area network (LAN), wide area network (WAN), internet, wireless networks, etc.

Figure 2:
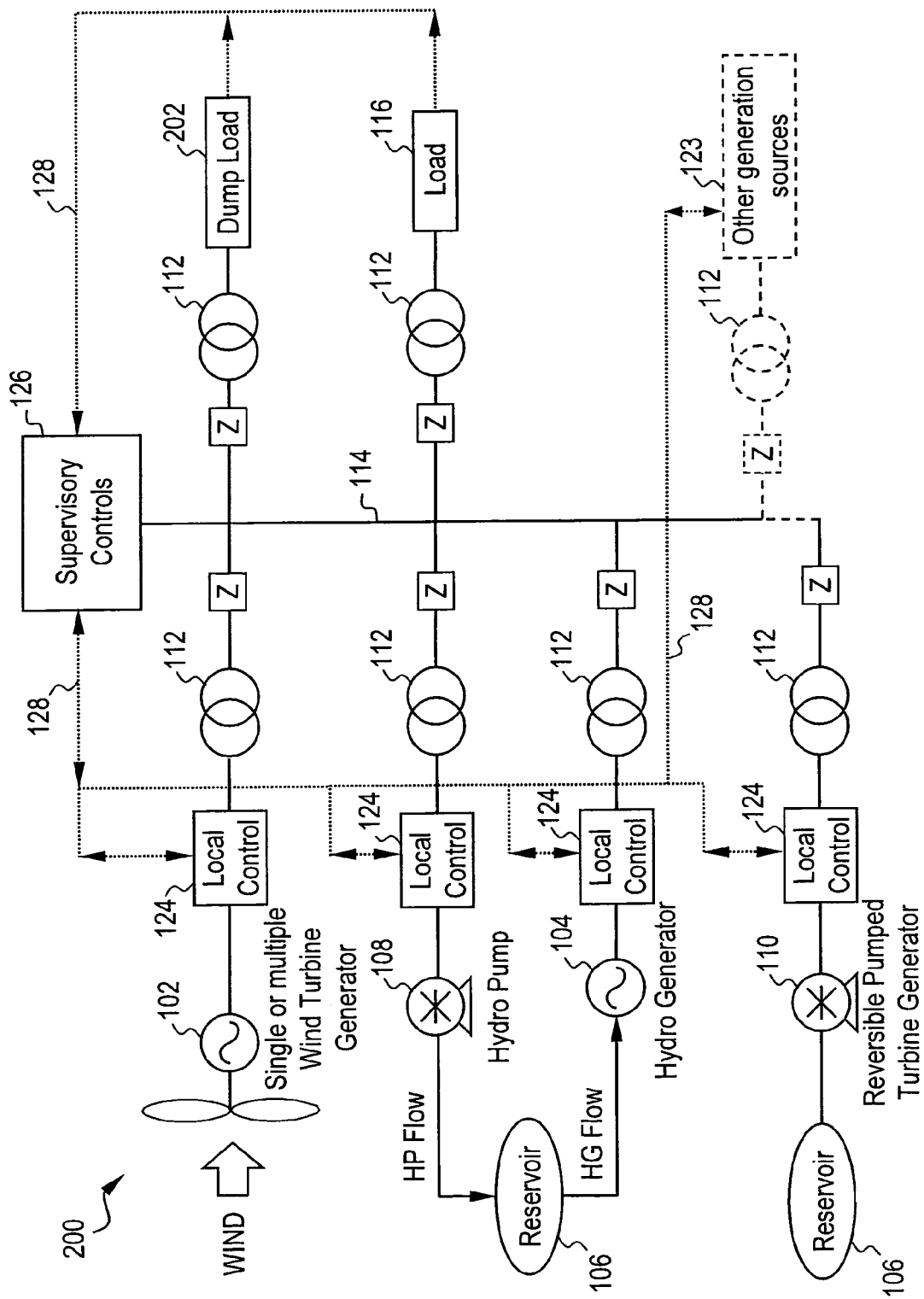
FIG. 2 is a schematic block diagram of an integrated, wind pumped hydro system that is configured as a stand-alone system, in accordance with a further embodiment of the invention.

FIG. 2 is a schematic block diagram of an integrated, wind pumped hydro system 200 that is configured as a stand-alone system, in accordance with a further embodiment of the invention. For ease of illustration, like system components included within FIG. 2 are designated using the same reference numerals as those shown in the grid-connected system of FIG. 1. As the stand-alone system 200 of FIG. 2 is not grid-connected, one or more dump loads 202 are provided in the event that excess capacity on the common power bus 114 cannot be used by a connected load 116 and/or the reservoir 106 is charged to full capacity. It will be understood, however, that the stand-alone system 200 could also utilize other types of energy storage devices, such as batteries for example, during excess capacity situations.

Figure 3:
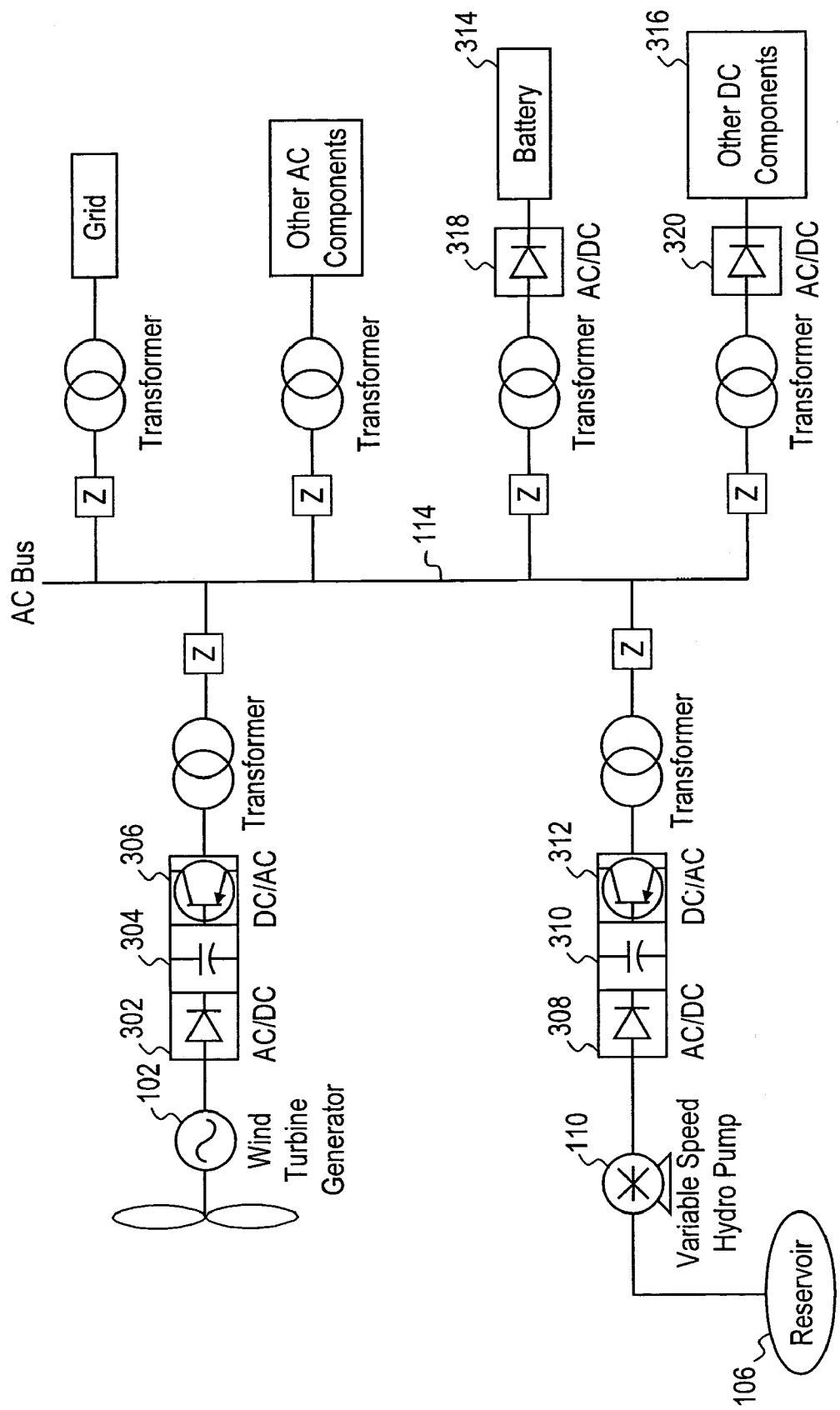
FIG. 3 is a schematic block diagram of a variable speed pump embodiment of an integrated, wind pumped hydro system, utilizing a common AC bus.

As indicated above, where a variable speed hydro pump is utilized, certain system components may also utilize a common DC bus, in lieu of or in addition to a common AC bus. This is illustrated through a comparison between FIGS. 3 and 4. In the configuration of FIG. 3, both the wind turbine generator 102 and the variable speed, reversible pumped turbine generator 110 are each provided with separate AC/DC and DC/AC conversion hardware in order to generate power at the desired voltage and frequency for the common AC bus 114.

In other words, since the wind turbine generates intermittent AC voltage at a variable frequency, this voltage is first converted by a first AC/DC converter (rectifier) 302 to a filtered DC value on a local DC bus 304 thereto. The voltage on the local DC bus 304 is then converted back to an AC voltage at the desired constant frequency (e.g., 60 Hz) by a first DC/AC converter (inverter 306). In addition, the reversible hydro pump/generator 110 also has the same power conversion equipment associated therewith; namely, a second AC/DC converter 308, a local DC bus 310, and a second DC/AC converter 312. Furthermore, any DC equipment utilized in the system, such as a storage battery 314 or other DC powered loads 316 will also require separate AC/DC converters 318, 320, in the absence of a dedicated DC bus.

Figure 4:
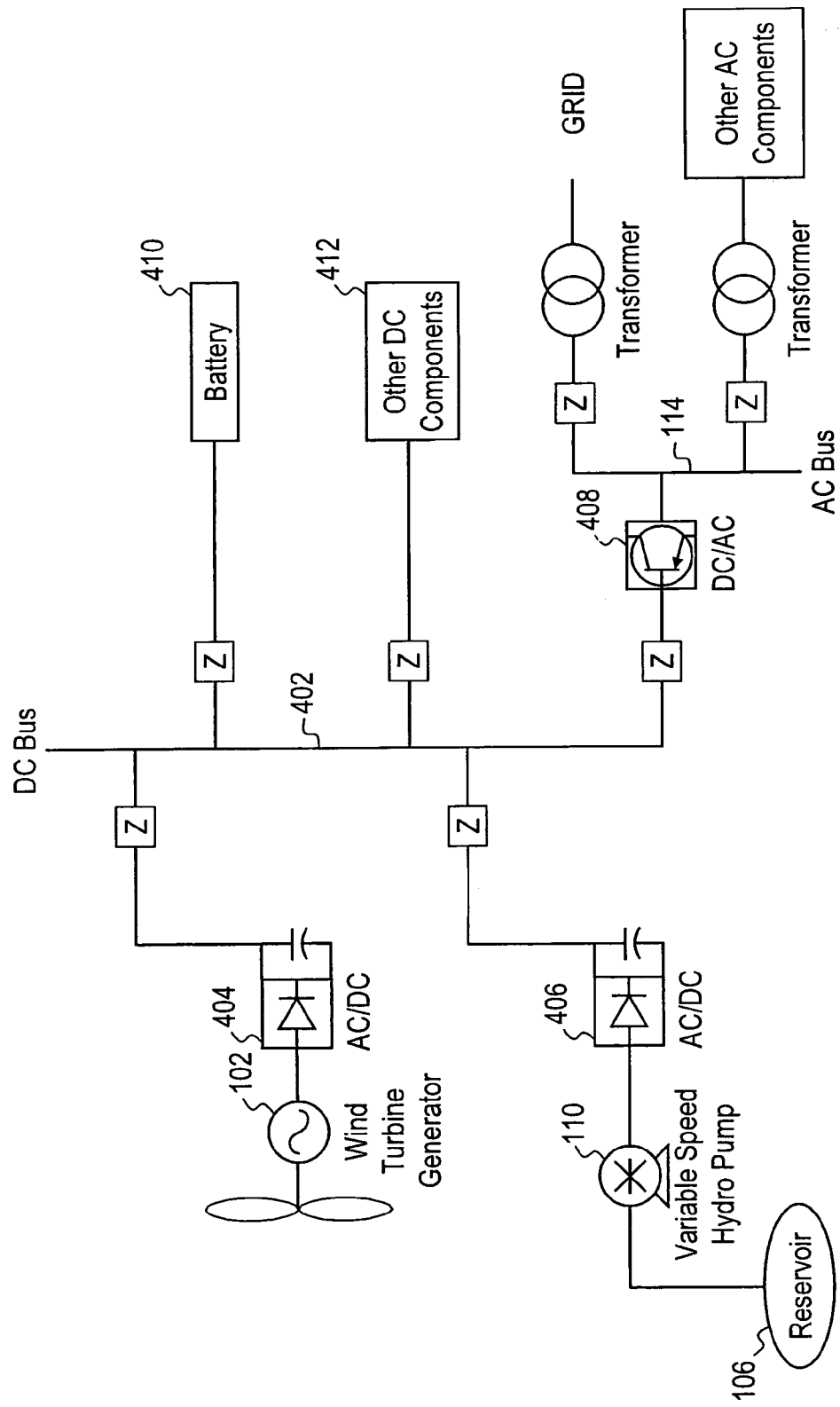
FIG. 4 is a schematic block diagram of a variable speed pump embodiment of an integrated, wind pumped hydro system, utilizing both a common AC and DC bus.

In contrast, FIG. 4 illustrates an alternatively proposed configuration wherein a common DC bus 402 receives the rectified, filtered AC voltages generated by the wind turbine generator 102 and the variable speed, reversible pumped turbine generator 104. Thus, although each parallel generator source is still provided with its own AC/DC converter (404, 406), only a single DC/AC converter 408 is used to provide the constant frequency AC voltage supplied to the local AC bus 114. Moreover, any system components that also utilize a DC bus, such as battery 410 and other DC loads 412 for example, can be directly connected to the common DC bus 402, thereby eliminating the need for additional rectifying equipment.

Referring once again to FIG. 2, the particular advantages of the local/supervisory control scheme implemented in the stand-alone system 200 will now be described in further detail. In contrast to the system of FIG. 1, the stand-alone system 200 of FIG. 2 is not connected to a grid that provides a voltage and frequency reference for the local controls 124. Accordingly, for the stand-alone system 200, the voltage and frequency references are dynamically determined, and the master source may thus be dynamically changed through appropriate communication between the supervisory controls 126 and the local controls 124.

Figure 5:
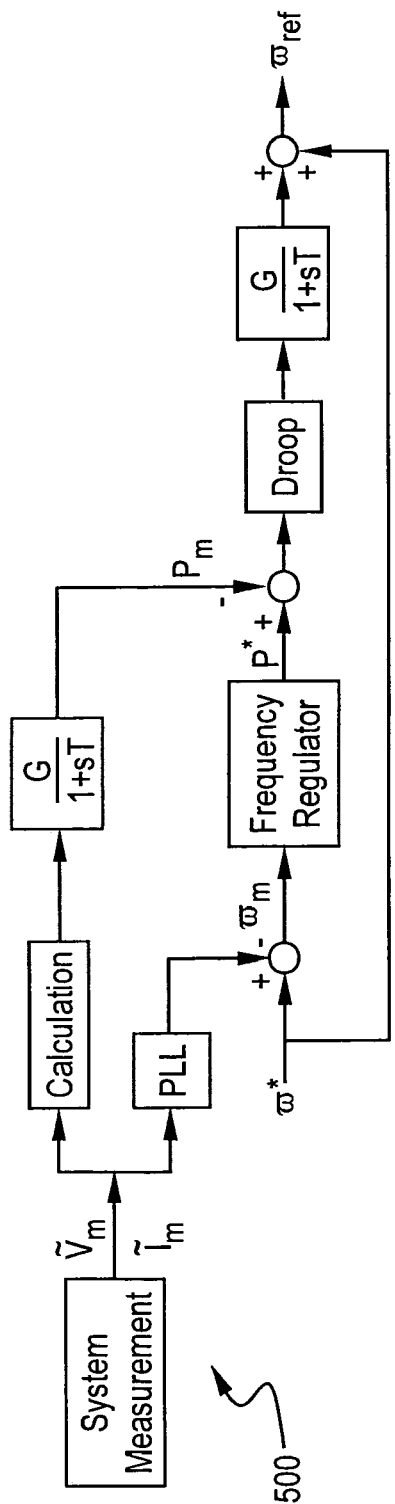
FIG. 5 is a block diagram of an exemplary control loop that illustrates the dynamic generation of a reference frequency for real power sharing in an integrated, wind pumped hydro system.

FIG. 5 is a block diagram of an exemplary control loop 500 that illustrates the dynamic generation of a reference frequency, $\omega_{ref}$, to ensure real power sharing among the multiple power generation units. The control loop 500 may be implemented within the local controls or within the supervisor controls. In either case, control loop 500 receives a commanded frequency, $\omega^*$, generated by the supervisory controls. System measurements (e.g., voltage, current) are used to determine the present master frequency, $\omega_m$, and thus the real power, $P_m$, being delivered by the master. In an exemplary embodiment, droop control for load sharing between the generator sources is used to determine the reference frequency, $\omega_{ref}$. The reference frequency, $\omega_{ref}$, is then used by inner control loops within both the wind turbine generator local controls and the hydro generator local controls. The manner in which a local control uses the reference frequency signal depends on whether the local control is for the wind turbine generator or the hydro generator.

Figure 6:
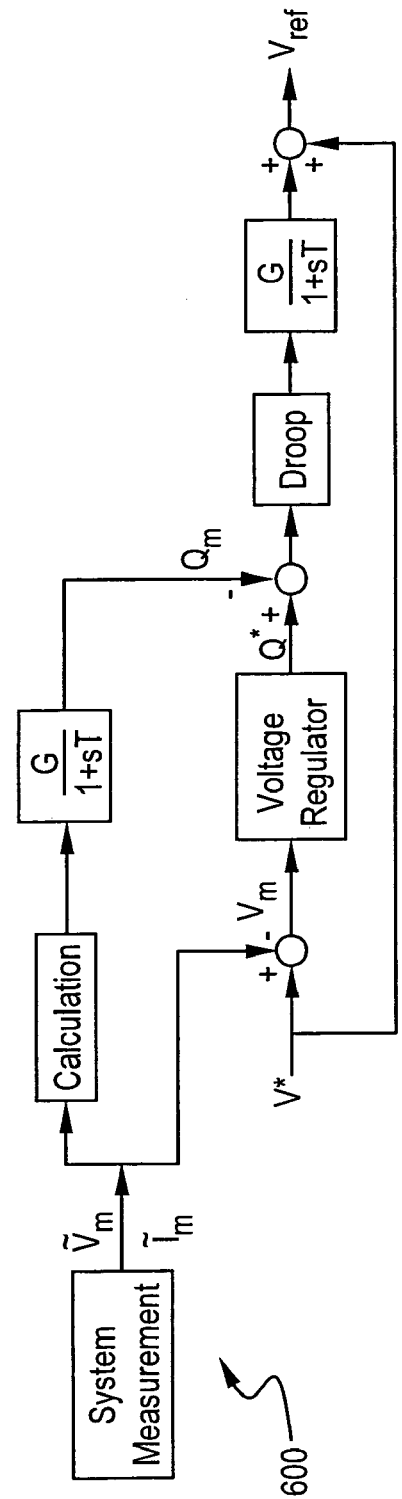
FIG. 6 is a block diagram of an exemplary control loop that illustrates the dynamic generation of a reference voltage for reactive power sharing in an integrated, wind pumped hydro system.

Similarly, FIG. 6 is a block diagram of an exemplary control loop 600 that illustrates the dynamic generation of a reference voltage, $V_{ref}$, to ensure reactive power sharing. Again, the control loop 600 may be implemented within the local controls or within the supervisor controls. In either case, control loop 600 receives a commanded voltage, $V^*$, generated by the supervisory controls. System measurements (e.g., voltage, current) are used to determine the present master voltage, $V_m$, and thus the reactive power, $Q_m$, being delivered by the master. Using again for example, a droop control methodology for load sharing between the generator sources, the reference voltage, $V_{ref}$, is then used by an inner control loop within the hydro generator local controls (since the output voltage of the wind turbine generator is not regulated).

As will thus be appreciated, the present invention embodiments not only address the intermittency issues associated with wind power, but also supply a completely renewable based solution. Moreover, by combining two of the least expensive renewable technologies, an economically viable solution for increasing renewables penetration (without sacrificing the system reliability and stability) is presented.

With the addition of electrical machines (and the larger time constants associated therewith), the integrated system will provide better performance under fault conditions and imbalanced load conditions. The load sharing capability may be provided through local control, such as by the droop method discussed above, and/or by supervisory control. The local controls for machines facilitate fast primary frequency/voltage regulation, while the supervisory controls facilitate slow secondary frequency/voltage recovery and economic dispatch, and optimize component life using tools such as weather prediction and water level measurements. Load control is to realize grid frequency dependent load dumping or shedding or real time pricing. Thus configured, the integrated system will be able to handle smooth transitions between operation of the hydro generator and hydro pump, or the transition between the two modes in the case of a reversible pump turbine generator. Further, the above described system embodiments are scalable for different types of generation/storage units with common interface characteristics and different types of wind turbines.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An integrated, wind-pumped hydro power generation system, comprising:
   at least one wind turbine generator device configured to generate output power for a common bus;
   at least one hydro generator device configured to generate output power for said common bus, said at least one hydro generator device powered by water flow; and
   said at least one wind turbine generator device and said at least one hydro generator device having corresponding local controls associated therewith; and
   a set of supervisory controls in communication with said common bus and each of said local controls.

2. The system of claim 1, wherein said water flow originates from a rechargeable storage reservoir.

3. The system of claim 2, further comprising a hydro pump coupled to said common bus, said hydro pump configured to recharge said storage reservoir when operated.

4. The system of claim 3, wherein said hydro pump comprises a variable speed hydro pump.

5. The system of claim 2, wherein said at least one hydro generator device further comprises a reversible pumped turbine generator configured to recharge said storage reservoir when operated in a pump mode.

6. The system of claim 1, wherein said common bus is configured as a stand-alone system.

7. The system of claim 6, further comprising one or more of: a dump load and an additional energy storage device selectively coupled to said common bus.

8. The system of claim 1, wherein said common bus is configured for selective coupling to a grid.

9. The system of claim 1, wherein said common bus is an alternating current (AC) bus.

10. The system of claim 1, further comprising a common direct current (DC) bus fed by rectified outputs of said at least one wind turbine generator device and said at least one hydro generator device.

11. The system of claim 10, further comprising a common alternating current (AC) bus fed by an inverter coupled to said common DC bus.

12. A stand-alone, integrated power system, comprising:
   at least one wind turbine generator device configured to generate output power for a common bus;
   at least one hydro generator device configured to generate output power for said common bus, said at least one hydro generator device powered by water flow; and
   said at least one wind turbine generator device and said at least one hydro generator device having corresponding local controls associated therewith; and
   a set of supervisory controls in communication with said common bus and each of said local controls;
   wherein said supervisory controls are configured for dynamically controlling master frequency and voltage references of the system.

13. The system of claim 12, wherein said water flow originates from a rechargeable storage reservoir.

14. The system of claim 13, wherein said local controls for said at least one wind turbine generator device and said at least one hydro generator device are configured to facilitate load sharing therebetween through a droop control method.

15. The system of claim 14, further comprising:
a first control block configured to generate a reference frequency used by said local controls associated with said at least one wind turbine generator device and said at least one hydro generator device for real power sharing therebetween; and
a second control block configured to generate a reference voltage used by said local controls associated with said at least one hydro generator device for reactive power sharing between at least one wind turbine generator device and said at least one hydro generator device.

16. The system of claim 15, wherein said first control block receives a frequency command signal from said supervisory controls as an input thereto.

17. The system of claim 15, wherein said second control block receives a voltage command signal from said supervisory controls as an input thereto.

18. The system of claim 13, wherein said supervisory controls are configured to receive wind and hydrological forecast information as inputs thereto.

19. A method for dynamically controlling an integrated, wind-pumped hydro power generation system, the method comprising:
configuring a set of supervisory controls in communication with corresponding local controls associated with at least one wind turbine generator device configured to generate output power for a common bus, and associated with at least one hydro generator device configured to generate output power for said common bus, said at least one hydro generator device powered by water flow; and
configuring said supervisory controls to dynamically control master frequency and voltage references of the system.

20. The method of claim 19, wherein said water flow originates from a rechargeable storage reservoir.

21. The method of claim 20, further comprising utilizing droop control with said local controls for said at least one wind turbine generator device and said at least one hydro generator device to facilitate load sharing therebetween.

22. The method of claim 21, further comprising:
generating a reference frequency used by said local controls associated with said at least one wind turbine generator device and said at least one hydro generator device for real power sharing therebetween; and
generating a reference voltage used by said local controls associated with said at least one hydro generator device for reactive power sharing between at least one wind turbine generator device and said at least one hydro generator device.

23. The method of claim 21, wherein said reference frequency is generated using a frequency command signal from said supervisory controls.

24. The method of claim 21, wherein said reference voltage is generated from a voltage command signal from said supervisory controls.

25. The method of claim 20, wherein said supervisory controls receive wind and hydrological forecast information as inputs thereto.

* * * * *